Patented Dec. 7, 1948

2,455,651

UNITED STATES PATENT OFFICE 2,455,651

PREPARATION OF NITRILES

Newman M. Bortnick, Philadelphia, Pa., assignor to Rohm & Haas Company, Philadelphia, Pa., a corporation of Delaware No Drawing. Application December 18, 1947, Serial No. 792,595

16 Claims. (Cl. 260—345)

This invention concerns a method for preparing nitriles. More particularly, it relates to a process for preparing nitriles by dehydrating compounds containing an oximino group to yield compounds containing a cyano or nitrile group in the place thereof.

It has previously been proposed to treat oximes with such reagents as acetic anhydride, acetyl chloride, phosphorus trichloride, phosphorus pentoxide, and the like, to yield nitriles. It has also been suggested to pass the vapors of oximes over dehydrating catalysts, such as alumina, alumina-silica, metal oxide-modified alumina-silica, and similar bodies, to yield nitriles. These methods have not proved to be entirely convenient in many cases nor particularly efficient, often causing large losses of materials.

An improved process for dehydrating aldoximes to nitriles is provided by the present invention. In this process, short reaction times with elevated yields of even sensitive nitriles become possible and nitriles can be obtained in cases where prior art methods were scarcely applicable.

In accordance with this invention, aldoximes are brought into contact with the salts of amines at temperatures between 120° and 350° C., and the reaction products are separated. A preferred range of temperatures for effecting the dehydration of the oximino group is from 150° to 275° C., the desired reaction proceeding fairly rapidly at these temperatures without troublesome formation of by-products or particular loss of amine salt. In the case of many aldoximes, the optimum conditions lie between 190° and 240° C. for dehydration on amine salts.

Amine salts suitable for use in this invention may be formed with any of the relatively strong non-oxidizing acids, particularly inorganic acids, such as hydrochloric, hydrobromic, sulfuric, benzene sulfonic, toluene sulfonic, phosphoric, tetraphosphoric, and the like. The amine salts of the acids are relatively non-volatile at reaction temperatures.

Typical of amines which are used with the above acids to form amine salts are heterocyclic amines, including pyridine, the lutidines, collidines, and picolines, quinoline, isoquinoline, and various alkylated quinolines and isoquinolines, mixtures of such amines, whether crude or refined, aniline, methylanilines, morpholine, piperidine, cyclohexylamine, dicyclohexylamine, benzylamine, and alkyl amines, including methyl, ethyl, propyl, butyl, amyl, octyl, dodecyl, and octadecylamines, mixed amines such as benzyldimethylamine, dodecyldimethylamine, octyldimethylamine, and the like. The amines may be primary, secondary, or tertiary, the latter being usually preferred. Monoamines usually give better yields than polyamines, such as ethylene diamine or polyalkylene polyamines.

An amine salt or a mixture of two or more amine salts serves as a catalyst for dehydrating an aldoxime. The aldoxime may be in the form of solid, liquid, or gas when brought into contact with the amine salt. In a particularly convenient procedure, the aldoxime is handled in an inert organic solvent, such as a hydrocarbon solvent.

The aldoxime is brought into contact with the amine salt within the above-specified range of temperature at normal atmospheric pressure or at a reduced pressure. Under the latter condition, there may be handled aldoximes of considerable molecular size, the nitriles formed therefrom being taken off as formed. In this way, there may be handled oximes yielding nitriles which boil even up to 200° to 250° C. at 10 to 15 mm. pressure.

Aldoximes which may be dehydrated by the above-described process may belong to the aliphatic, cycloaliphatic, aromatic, aromatic-aliphatic, or heterocyclic series and may be saturated or unsaturated. The compounds may contain other functional groups than the oximino group. Even though a sensitive additional functional group is present and it may undergo reaction, nevertheless the oximino group is converted to a nitrile group. Groups such as hydroxyl, ether, ester, cyano, carbonyl, nitro, amino, and so on, have not been found to interfere with the dehydration reaction, which is proved thereby to be one of unusually wide applicability and value.

As typical of the aldehyde oximes which are convertible to nitriles by the method of this invention, there may be mentioned the oximes of acetaldehyde, propionaldehyde, butyraldehyde, isobutyraldehyde, methylethylacetaldehyde, diethylacetaldehyde, 2-ethylbutyraldehyde, valeraldehyde, isovaleraldehyde, caproaldehyde, heptaldehyde, capryaldehyde, capraldehyde, luaraldehyde, stearaldehyde, acrolein, α-methylacrolein, crotonaldehyde, β-methylcrotonaldehyde, 2-ethyl-3-propylacrolein, α-ethyl-β-ethylacrolein, pentenal, propargylaldehyde, cinnamaldehyde, benzaldehyde, tolualdehyde, tert.-butylbenzaldehyde, hexahydrobenzaldehyde, 1-cyclohexene-1-carboxaldehyde, tetrahydrofurfuraldehyde, furfuraldehyde, and the like. Oximes of aldehydes of not over ten carbon atoms are of primary importance.

In the preferred methods of effecting the dehydration of an oximino group to a nitrile group, the aldoxime is added to a molten amine salt. The aldoximine may be added as a solid or a liquid. Again, it may be passed in the form of a vapor over or through a molten amine salt. The nitrile which results is taken off and may be purified by conventional steps, including washing, neutralizing, charcoaling, and distilling.

Details of typical preparations of nitriles from aldoximes are given in the following examples.

Example 1

(a) Furfuraldoxime was prepared from furfuraldehyde and hydroxylamine hydrochloride. Furfuraldehyde was freshly distilled and 192 grams thereof was placed in a separatory funnel in an apparatus equipped with stirrer in the reaction vessel. In a second separatory funnel of the apparatus was placed a solution of ninety grams of sodium hydroxide in two hundred milliliters of water. In the reaction vessel was placed a solution of 154 grams of hydroxylamine hydrochloride in two hundred milliliters of water to which eight milliliters of a bromocresol green solution was added. The furfuraldehyde and the sodium hydroxide solution were then simultaneously and slowly added to the hydroxylamine hydrochloride solution while the reacting mixture was stirred. The temperature was kept below 22° C. by external cooling. Care was taken that the bromocresol green did not become yellow by controlling the relative rate of addition of alkali solution. When a yellow-green color developed, additional alkali was admitted. The pH of the reaction mixture was thus kept at an optimum for the reaction. It was not necessary to run in the full charge of alkali. The reaction mixture was allowed to stand and form two layers, which were separated. The aqueous layer was twice extracted with benzene, which was then added to the organic layer. The total organic layer was then washed, the solvent was distilled therefrom, and the residue was dried under reduced pressure. The product was essentially pure furfuraldoxime in a yield of 94%. This product may be further purified by crystallization or distillation, but the highly purified material was not found required for the next stage of the procedure.

(b) In an apparatus having a reaction vessel equipped with stirrer and condenser, there was placed 232 grams of mixed methylated pyridines which were converted to the hydrochloride. The charge of amine hydrochloride was heated to 200° C., and 349 grams of molten furfuraldoxime was added slowly thereto. The temperature was gradually increased to a pot temperature of 250° C. The products of the reaction were taken off and condensed. Benzene was added to the condensate to assist in separation of layers. The aqueous layer was separated and extracted with benzene, which was then added to the organic layer. The benzene solution was then washed with dilute hydrochloric acid and with water. It was then distilled. The fraction boiling at 146° to 155° C. amounted to 260 grams, an 89.5% yield. This fraction was redistilled within a 1° C. range and was found to be pure furonitrile.

Example 2

Instead of adding molten furfuraldoxime to the charge of mixed methylated pyridines of Example 1 (b), there was slowly added thereto a 50% benzene solution of furfuraldoxime. The vapors were taken off and condensed as before, and the process was interrupted only after ten gram moles of furfuraldoxime had been reacted. The condensate was worked up as above with washing and distillation. The yield of pure furonitrile was 69%.

Example 3

The procedure of Example 1 (a) was followed, substituting an equivalent weight of benzaldehyde for the furfuraldehyde and hydroxylamine in the form of its sulfate for the hydrochloride. A 90.5% yield of benzaldehyde oxime was thus obtained.

A fifty-eight gram portion of quinoline was converted to the hydrochloride and placed in a reaction vessel, where it was heated to 190° C. The pressure was then reduced and sixty grams of benzonitrile added while the pressure was kept between 50 and 250 mm. The temperature was held between 190° and 210° C. The reaction products were taken off and condensed. Benzene was added to the condensate, and the benzene solution was washed with dilute hydrochloric acid and with water. The solution was then distilled. There was obtained 46.7 grams of benzonitrile (refractive index, $n_D^{20}$, 1.5278), corresponding to a 91% yield.

Example 4

In accordance with the procedure described in Example 1 (b), n-butyraldehyde oxime was added to molten picoline hydrochloride maintained at 205°–235° C. With about two hundred grams of the amine salt in the reaction vessel, there was slowly added the butyraldoxime until a total of four hundred grams had been added, at which time the process was interrupted. The amine salt could have been further used, if so desired, to convert a considerably larger amount of the oxime. Decomposition products do not accumulate rapidly, and the small amount of amine which is carried off in the reaction vapors may be replaced if it is desired to maintain the level of catalyst.

A yield of 84% of butyronitrile was obtained. The method is, of course, applicable to other aliphatic aldehyde oximes, particularly those of two to eighteen carbon atoms.

Example 5

The procedure of Example 4 was followed for conversion of α-ethylhexanal oxime to α-ethylhexonitrile. About sixty grams of a commercial mixture of picolines, lutidines, and collidines was converted to the hydrochloride form and maintained at 180° to 210° C. while seventy-five grams of α-ethylhexanal oxime was added. During this operation, the pressure was kept below 250 mm. The reaction products were treated as in previous example, thus yielding fifty-eight grams of α-ethylhexonitrile, having a boiling point of 185° C. and a refractive index, $n_D^{20}$, of 1.4188.

Example 6

(a) Methacrolein oxime was heated at 145°–150° C. and passed into a small reaction vessel containing twenty-four grams of pure pyridine which had been reacted with an equivalent amount of hydrogen chloride to form a salt. The pyridine hydrochloride was maintained at a temperature of 200°–220° C. The reaction products were collected, washed, and distilled as in previous examples. When eighty-five grams of methacrolein oxime had been vaporized, the preparation was interrupted. The amount of methacrylonitrile collected at this point corresponded to a yield of 60%.

(b) The procedure just described was repeated with a commercial mixture of picolines, lutidines, and collidines substituted for the pyridine. Methacrolein oxime was vaporized as before and passed over the molten amine hydrochloride at a temperature of about 220° C. During a period of forty minutes, eighty-five grams were thus reacted. From the reaction products there was separated methacrylonitrile in a yield of 70% of theory.

The product, when heated with a small amount of benzoyl peroxide, gave a hard, clear polymer and, mixed with methyl methacrylate and a peroxide catalyst, gave a hard, tough, clear copolymer.

(c) Methacrolein oxime was run dropwise into a reaction vessel containing di-2-ethylhexylamine hydrochloride heated to 205°–220° C. The reaction products were taken off through a packed column to provide reflux and then condensed. When twenty-one grams of methacrolein oxime had been added, the preparation was discontinued. The yield of methacrylonitrile separated at this point was 22% of theory.

*Example 7*

(a) There was prepared α-methoxyisobutyraldoxime by the method described in application Serial No. 774,665, filed September 17, 1947, wherein the dimeric addition product of nitrosyl chloride and methyl alcohol are reacted in the presence of an inorganic compound, such as calcium carbonate, sodium carbonate, or sodium bicarbonate, which is not strongly alkaline per se but which is capable of neutralizing strong acids.

The molten oxime was run slowly into a melt of thirty grams of a commercial mixture of methylated pyridines, boiling between 130° and 170° C., converted into their hydrochlorides, heated to 220°–225° C., and vigorously stirred. When fifty-eight grams of methacrolein oxime had been thus added, the preparation was discontinued. There were obtained both α-methoxyisobutyronitrile and methacrylonitrile. When the products had been washed and fractionally distilled, it was found that yields of 8% of the former and 57% of the latter were obtained.

(b) The temperature of the above amine hydrochlorides was adjusted to 210° C. and 116 grams of α-methoxyisobutyraldoxime run into the molten amine salts while they were being stirred. Upon separation of the products in the usual way, there was obtained a yield of 12% of α-methoxyisobutyronitrile and of 39% of methacrylonitrile.

(c) The temperature of the above amine hydrochlorides was adjusted to 200° C. and forty grams of molten α-methoxyisobutyraldoxime slowly added. There resulted a yield of 13% of theory of α-methoxyisobutyronitrile and 63% of theory of methacrylonitrile.

(d) A portion of thirty grams of the commercial mixture of methylated pyridines, boiling between 130° and 170° C., was converted to the bisulfate and used in place of the hydrochloride. The amine bisulfate was heated at 220° to 225° C. and eighty-seven grams of α-methoxyisobutyraldoxime slowly added thereto. There was obtained a yield of 24% of α-methoxyisobutyronitrile and 15% of methacrylonitrile.

(e) The bisulfate was replaced with an equivalent amount of the p-toluene sulfonate, and the temperature of this amine salt was held at 200° to 205° C. After addition of forty grams of α-methoxyisobutyraldoxime, there was obtained a yield of 3% of α-methoxyisobutyronitrile, and 17% of methacrylonitrile.

In place of α-methoxyisobutyraldoxime, there may be used other alkoxyisobutyraldoximes, such as the ethoxy or butoxy compounds. In all cases, there occurs dehydration and simultaneously dealcoholation.

In place of the above aldoximes shown by way of illustration, there may be used other aldoximes with formation of nitriles therefrom. The method therefor is simple, convenient, and efficient. The catalysts are recoverable in case they become contaminated with objectionable amounts of decomposition or by-products. The reaction to nitriles takes place rapidly in the presence of amine salts, permitting very short times of contact with catalyst and subjection to only moderately elevated temperatures. For this reason, even highly sensitive oximes and nitriles may be handled with pure products resulting. The process is effective with the widest variety of aldoximes and is effective with compounds having one or more oximino groups with or without other functional groups.

While amine salts generally may be used as catalysts in the dehydrating of oximes to nitriles, the salts formed with strong inorganic acids have many advantages. Of the various kinds of amines, those which have a particularly favorable balance of properties are the pyridines, including in this term not only pyridine itself but also alkylated pyridines. The readily available pyridines boil as free amines between 115° and about 200° C. and are eminently satisfactory as catalysts for the purposes of this invention.

I claim:

1. A process for converting aldoximes to nitriles which comprises contacting aldoximes with amine salts at temperatures of 120° C. to 350° C.

2. A process for preparing nitriles which comprises dehydrating aldoximes by heating them in the presence of an amine salt at 120° to 350° C.

3. A process for preparing nitriles which comprises dehydrating aldoximes by heating them in the presence of an amine salt at 150° to 275 C. and separating nitriles from the reaction products.

4. A process of preparing nitriles which comprises dehydrating oximes of aliphatic monoaldehydes having two to eighteen carbon atoms by heating them in contact with a monoamine salt at 150° to 275° C. and separating nitriles from the resulting products.

5. The process of claim 4 wherein the amine salt is a salt of a tertiary heterocyclic amine and a strong inorganic acid.

6. The process of claim 5 wherein the amine salt is a pyridine salt.

7. A process of preparing methacrylonitrile which comprises dehydrating methacrolein oxime by heating it in contact with a monoamine salt at 150° to 275° C. and separating methacrylonitrile from the reaction products.

8. A process for preparing nitriles which comprises dehydrating a heterocyclic monoaldehyde oxime by heating it in contact with a monoamine salt at 150° to 275° C. and separating a heterocyclic nitrile from the resulting products.

9. The process of claim 8 wherein the amine salt is the salt of a tertiary heterocyclic amine and a strong inorganic acid.

10. The process of claim 9 wherein the amine salt is a pyridine salt.

11. The process of preparing furonitrile which comprises dehydrating furfuraldoxime by heating it in contact with a monoamine salt at 150° to 275° C. and separating furonitrile from the resulting products.

12. The process of preparing nitriles which comprises dehydrating an α-alkoxyaldoxime by heating it in contact with a monoamine salt at 150° to 275° C. and separating nitriles from the resulting products.

13. The process of preparing methacrylonitrile and an α-alkoxyisobutyronitrile which comprises dehydrating an α-alkoxyisobutyraldehyde oxime by heating it in contact with a monoamine salt at 150° to 275° C. and separating said nitriles from the resulting products.

14. The process of claim 13 wherein the monoamine salt is a salt of a pyridine and a strong inorganic acid.

15. The process of preparing methacrylonitrile and α-methoxyisobutyronitrile which comprises dehydrating α-methoxyisobutyraldoxime by heating it in contact with a monoamine salt at 150° to 275° C. and separating said nitriles.

16. The process of claim 15 wherein the monoamine salt is a salt of a pyridine and a strong inorganic acid.

NEWMAN M. BORTNICK.

No references cited.